United States Patent Office 3,072,094
Patented Jan. 8, 1963

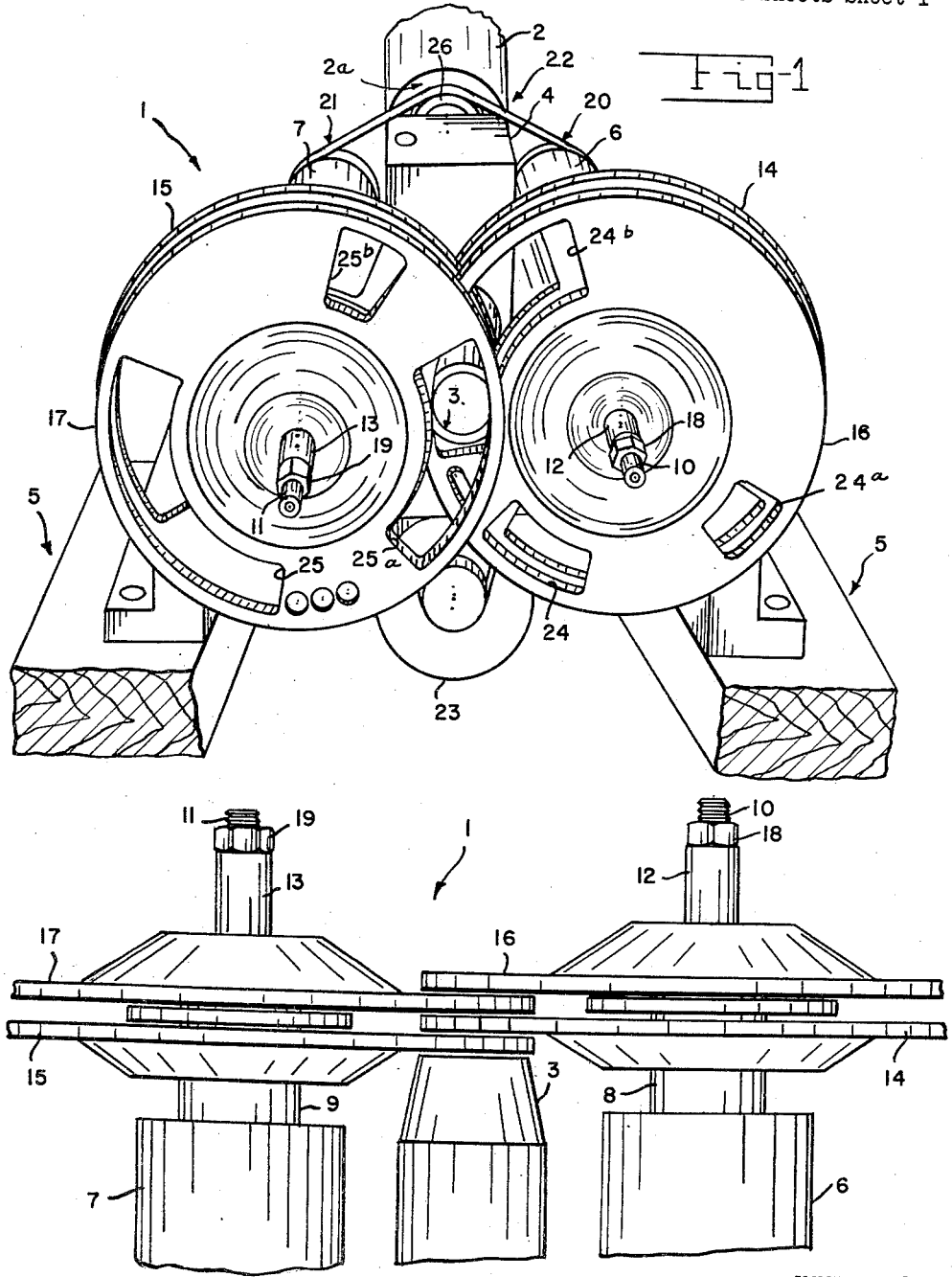

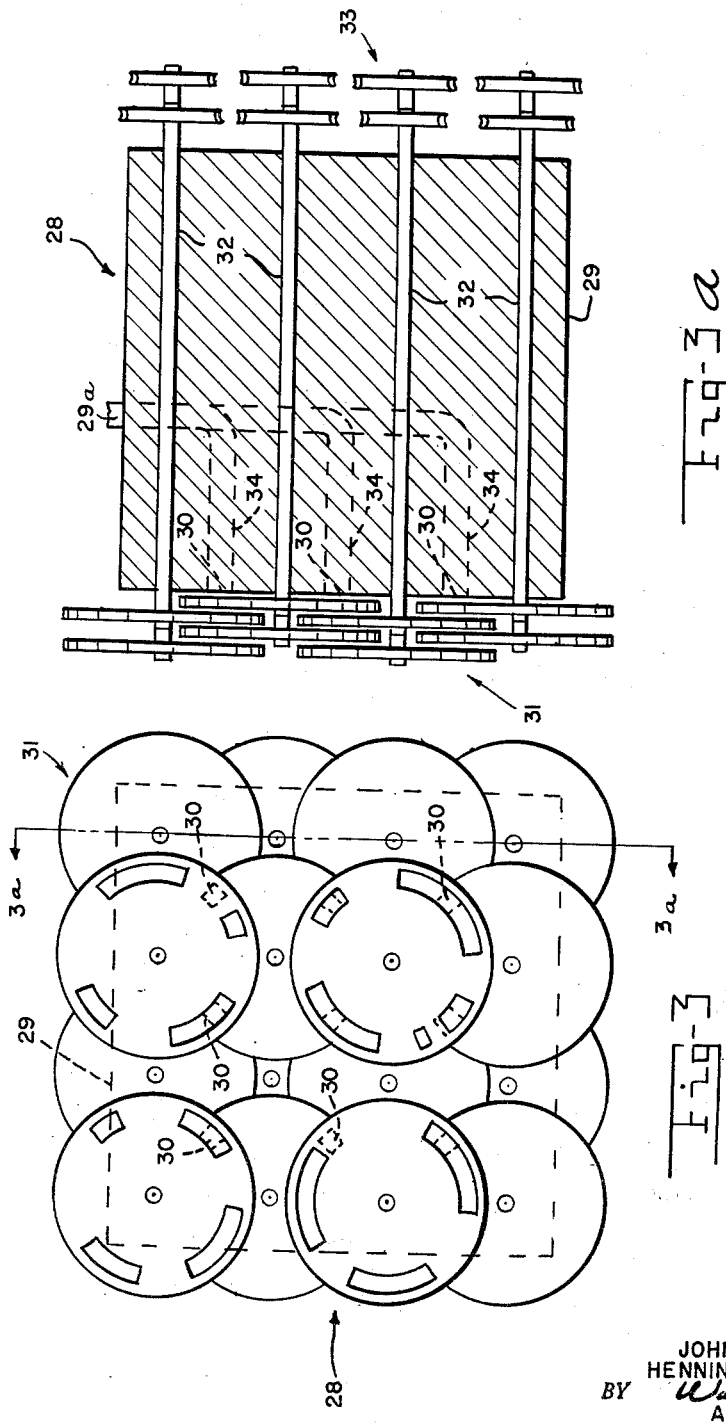

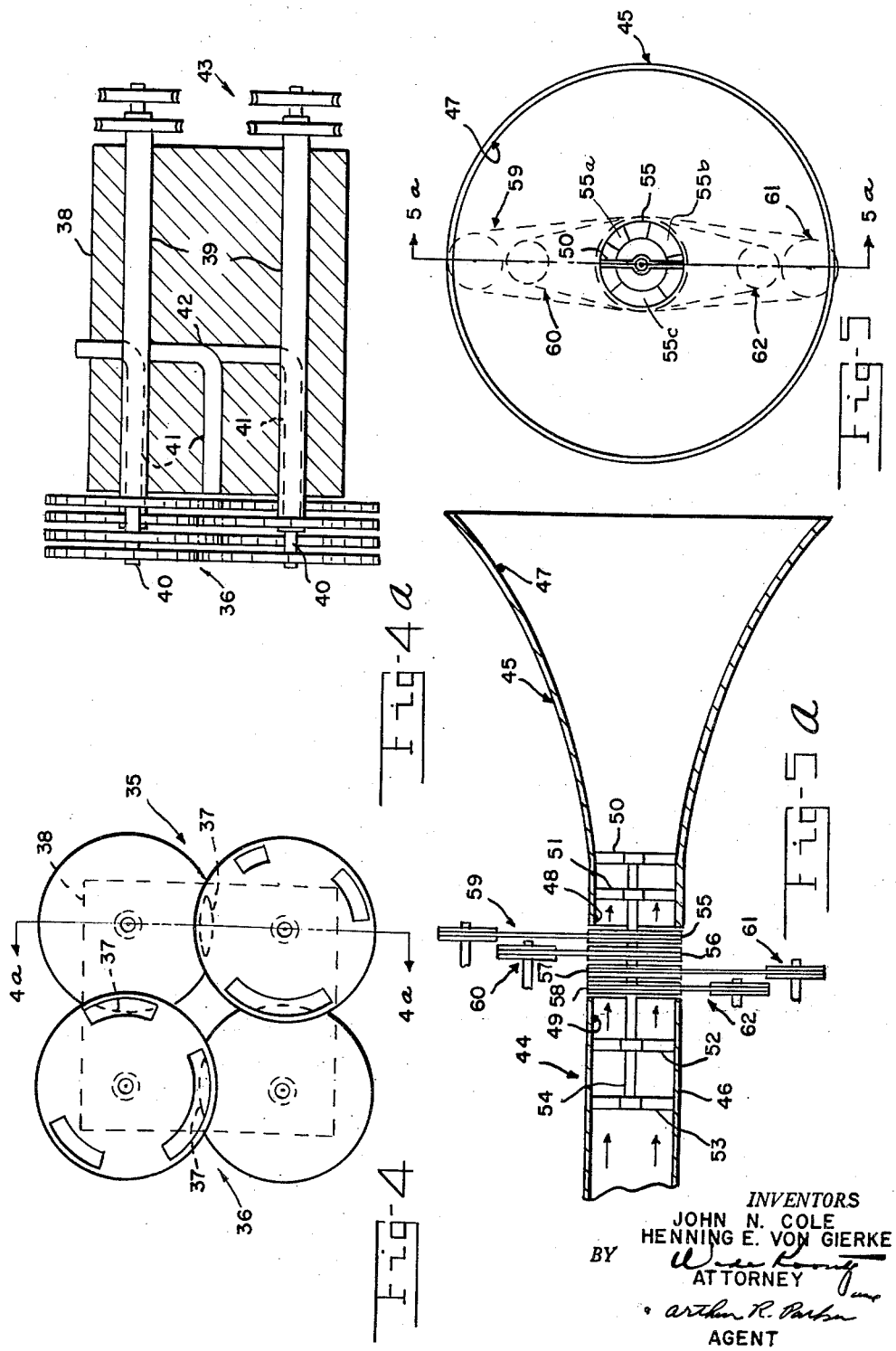

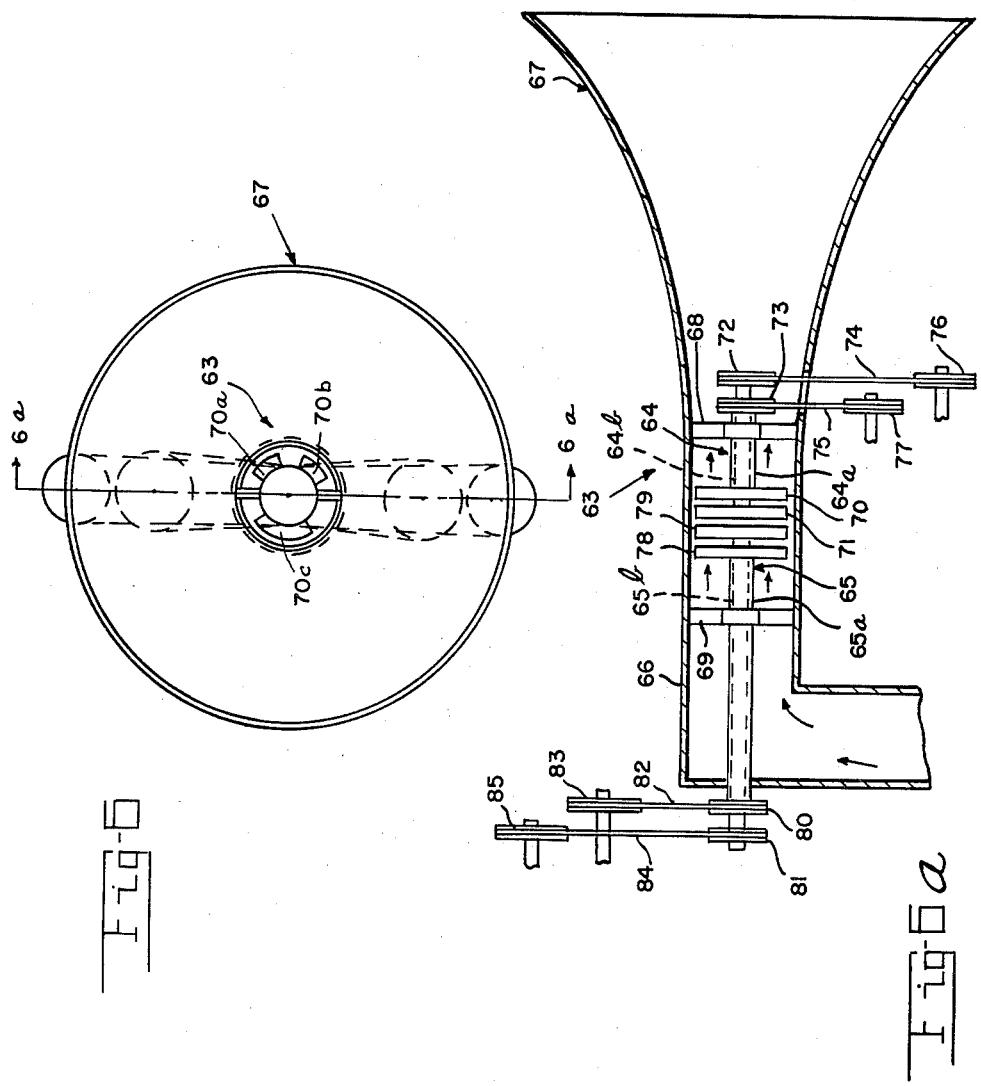

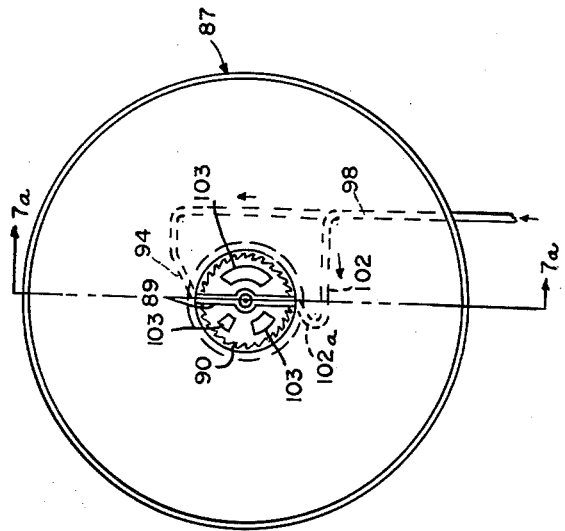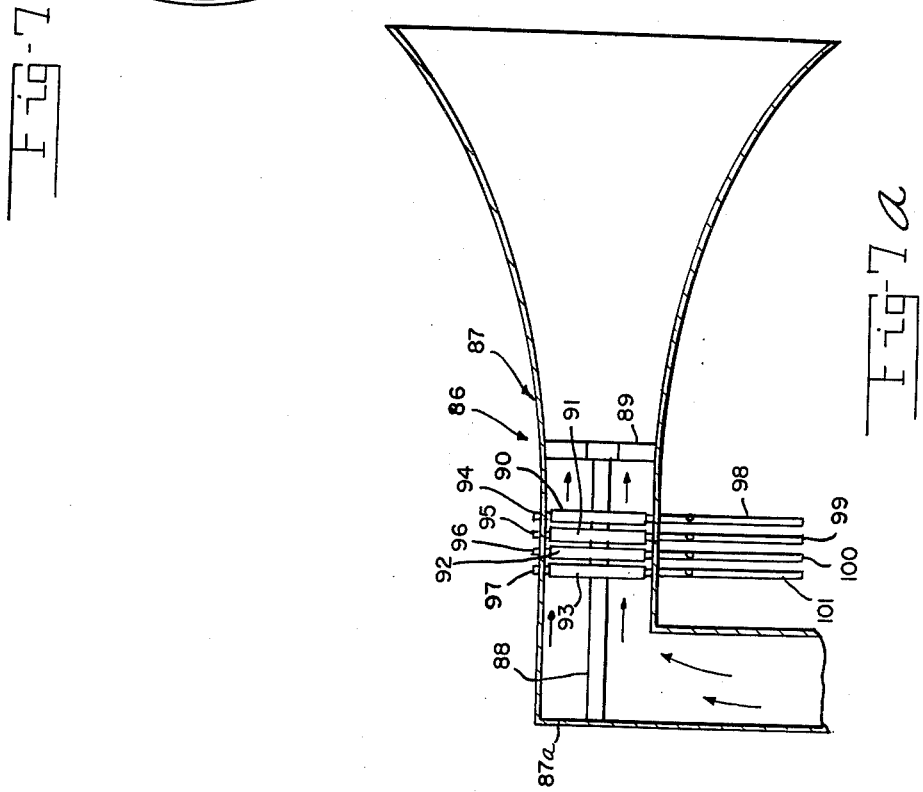

3,072,094
ACOUSTIC SIREN FOR GENERATING WIDE BAND NOISE WITH IMPROVED EFFICIENCY
John N. Cole, Fairborn, and Henning E. Von Gierke, Yellow Springs, Ohio, assignors to the United States of America as represented by the Secretary of the Air Force
Filed Feb. 12, 1960, Ser. No. 8,466
1 Claim. (Cl. 116—147)
(Granted under Title 35, U.S. Code (1952), sec. 266)

The invention described herein may be manufactured and used by or for the United States Government for governmental purposes without payment to us of any royalty thereon.

This invention relates generally to the simulation of random, high-intensity wide-band noise for purposes of testing the effect thereof on various materials and, more particularly, to a specific means for simulating the environmental noise conditions of the rocket and turbojet types of engines involving an improvement over our U.S. Patent No. 2,912,958.

For the past several years an ever-increasing need has existed for the environmental testing of various materials, electronic components, and even full-sized air frame structures while positioned in high intensity sound fields. A primary problem involved in the various environmental test programs has been the availability of a practical and yet economical noise source which could satisfactorily simulate the wide band, high-intensity and random noise normally produced during the operation of turbojet and rocket engines and thus effecting the conditions tending to produce, as for example, metal fatigue, malfunction of electronic equipment and exposure of personnel to excessive noise environments during actual operation. Previous attempts to solve this major problem has involved the use of purely electrodynamic transducers, air jets, small ram-jets and air modulated loud-speakers. However, the latter approaches to the problem have proved inefficient in operation because of a failure to completely simulate the sound pressures and power levels found in actual practice. In connection with the latter, it has been found that the high sound pressure levels of from 150–175 decibels (dbs) required over large test areas can be generated economically only with the use of sirens; however, the use of sirens, being pure tone devices, have thus far proven unsuccessful for simulation of the wide band, high-intensity random noise conditions required for the successful testing of the effect of the noise environments of turbojet and rocket engines on various materials, electronic components and personnel. Thus, it is obvious that a new approach to the above problem is required directed towards the development of a suitable noise source in order to simulate as closely as possible the actual environmental noise conditions produced during turbojet and rocket engine operations. The acoustic siren of the present invention represents an improved wide-band noise source successfully simulating the previously described environmental test conditions to a high degree. Operation of the above-mentioned wide band noise siren of the present invention resides in the irregular modulation of an air stream instead of the usual periodic "chopping" or modulating normally utilized in a conventional siren. This principle of operation for the wide band noise siren of the present invention is mechanically implemented or achieved through means of a series of overlapping rotors irregularly slotted and rotated at speed ratios such that any instantaneous position of the rotors does not repeat itself except by chance and, then, only over long time intervals.

The above-described principle of operation is quite similar to that previously disclosed for the Acoustic Siren described and claimed in our U.S. Patent No. 2,912,958. The device of the present invention represents an improvement over that found in the aforesaid patent.

An object of the present invention, therefore, resides in an improved acoustic siren effecting the random, mechanical modulation of an air stream with increased efficiency.

A further object of the present invention utilizes a noise source incorporating a series of overlapping rotors mounted in coaxial pairs and having randomly spaced slots to randomly act on a jet stream.

A still further object of the invention provides an acoustic siren that modulates an air jet in an improved and novel manner to produce sound pressures in random and wide band fashion to more efficiently simulate the noise characteristics of actual service environments.

An additional object of the invention resides in the utilization of a high intensity, wide band noise generator incorporating a plurality of jet orifices and suitable for the practical simulation of the noise environments of turbojet and rocket engines and incorporating a plurality of overlapping rotors, each modulating more than one orifice.

An object of the invention involves the utilization of a plurality of coaxially mounted rotors mounted in pairs on coaxial shafts and forming a high intensity, wide band generator simulating the characteristic noise environments of turbojet and rocket engines and including a nozzle orifice coaxial with the rotors and of substantially identical diameter to that of each of said rotors.

Other objects and advantages of the invention will become apparent from the following description, taken in connection with the accompanying drawings, in which like reference characters refer to like parts in the several figures.

FIG. 1 is a partially broken away, front perspective view of one form of the invention, illustrating details of the acoustic siren and the support therefor.

FIG. 2 is an enlarged partially broken away top view of the acoustic siren of FIG. 1, illustrating further details of the coaxially mounted shafts utilized with the invention.

FIG. 3 is a somewhat schematic front view of a second form of the acoustic siren on a reduced scale formed with a series of overlapping rotors.

FIG. 3a is a longitudinal sectional view taken on section line 3a–3a of FIG. 3, illustrating details of the rotor support means for the modification of FIG. 3.

FIG. 4 is a schematic front view on a reduced scale of a third form of the acoustic siren of the invention.

FIG. 4a is a longitudinal sectional view taken on section line 4a–4a of FIG. 4, illustrating details of the rotor support for the modification of FIG. 4.

FIG. 5 is a front view of a fourth form on a reduced scale of the acoustic siren of FIG. 1, illustrating details thereof as attached to an acoustic horn.

FIG. 5a is a longitudinal sectional view taken on section line 5a—5a of FIG. 5, illustrating additional details of the inventive siren and acoustic horn of the modification of FIG. 5.

FIG. 6 is a front view on a reduced scale similar to that of FIG. 5, illustrating details of a modified rotor drive means for the inventive acoustic siren.

FIG. 6a is a longitudinal sectional view taken on section line 6a—6a of FIG. 6, illustrating additional details of the inventive siren device and rotor drive means therefor.

FIG. 7 is a front view on a reduced scale of another modified form of the acoustic siren of FIG. 1, illustrating details of another modified form of drive means for the rotors thereof.

FIG. 7a is a longitudinal sectional view taken on section line 7a—7a of FIG. 7, illustrating additional details of the modified drive means for the rotors of the inventive acoustic siren device.

In the study of the theory of operation relative to the generation of wide band noise frequencies, it has been determined that the use of conventional one-rotor sirens generates a periodically modulated flow of air through the action of opening and closing a nozzle with a moving rotor having one or more openings. Thus, the open nozzle area of these conventional sirens is a periodic trapezoidal function of time which may be approximated by means of a periodic rectangular pulse. During a specified time interval, the amplitude of the aforesaid pulse is equal to the full open nozzle area and is zero during the remaining period of time. The time and period are determined by the rotor speed and the dimensions of the openings in the rotor. If, however, two or more overlapping rotors are utilized with different speeds and different openings, the aforesaid open nozzle area is, in fact, equal to the area of the fully opened nozzle when both rotors operate to open the nozzle, and is equal to zero if at least one rotor completely closes the nozzle.

In addition to the above considerations, the efficiency of the acoustic siren of the invention is increased by combining or acoustically loading the same with an exponential horn which acts as an impedance matching device to more efficiently couple the siren to the air medium and thereby allow a greater transfer of power to the medium. Therefore, in the present invention, the performance of the wide band noise siren was tested and evaluated when acoustically loaded by placing the throat of an exponential horn directly in front of and in line with the nozzle and rotors. The latter arrangement effected a considerable increase in the sound output and resulted in an increase in the overall power level to the extent of approximately ten decibels. Of course, the horn may be designed for the particular acoustic siren in order to achieve its maximum or optimum performance. It has also been determined that the utilization of the acoustic horn either without or with segmentation to effect multiple horn structure characteristics, if desired, with the acoustic siren makes the latter more directive in certain directions and, at the same time, also increases the total power output of the siren.

In addition to the various effects of rotor speeds and horn loading on the power output of the invention acoustic siren, there is also a considerable relation between the noise actually produced by the siren and the air flow fed to the siren. Thus, it has been found, for example, that for a given range of rotor speeds, the entire power spectrum may be shifted in level with only minor changes in shape if the weight flow of air fed to the acoustic siren is varied.

Finally, one other important consideration or characteristic of random noise involves the effect of peak pressure distributions contained in a noise environment relative to significant structural and electronic failures. Thus, tests have shown that the peak pressure distribution of the acoustic siren noise of the present invention compares with the noise of solid fuel rockets.

It is to be emphasized, therefore, that the wide band noise acoustic siren of the present invention acts as a tool or aid in the simulation of the types of noise normally found prevalent during jet and rocket engine operation. In connection with the latter, it has been determined that with the previously-mentioned horn loaded acoustic siren of the present invention having a 3.1″ diameter nozzle, a power level comparable to that occurring during normal operation of the J-47 and J-57 jet engines, for example, is achieved. Moreover, the overall sound pressure level that the aforesaid acoustic siren produces in a sixty cubic feet reverberation chamber equals 165 decibels with an instantaneous peak pressure of 175 decibels which sound pressure level range is equivalent to that experienced in the vicinity of the highest thrust rocket engines.

Thus, it is seen that the wide band acoustic siren of the present invention achieves its object through means of an improved and economical, high-intensity random noise source for the simulation of the most severe noise environments in the laboratory. Moreover, considerably larger sirens than the ones built to date are now feasible without changes in design, resulting in still higher acoustic power levels.

Referring specifically to FIGS. 1 and 2 of the drawings, the acoustic siren of the present invention is indicated generally at 1 as including a gas chamber housing 2 adapted to deliver a supply of air or other gas under pressure to the nozzle 3 incorporated in the nozzle housing 4 (see FIG. 1). Said gas chamber housing 2 is substantially identical to that shown in the modification of FIGS. 3 and 3a of the drawings; however, it is only shown in partially broken-away form in the modification of FIG. 1 of the drawings merely for the sake of simplicity since its specific form is, in fact, unimportant to the present invention. The only other consideration of importance resides in the fact that the modification of FIGS. 3 and 3a illustrates a gas chamber housing 29 that incorporates a plurality of identical nozzles 30, whereas, said gas chamber housing 2 of FIG. 1 is illustrated as including a cube-shaped housing structure generally indicated at 4 and a projecting spherical-shaped single nozzle generally indicated at 3. Nozzle housing 4 is mounted in any desirable manner on the main support base schematically illustrated at 5, the specific nature of such support being completely irrelevant to the present invention. The remaining feature distinguishing the modification of FIGS. 1 and 2 from that of FIGS. 3 and 3a, for example, resides in the provision of a space portion indicated generally at 2a in the modification of FIGS. 1 and 2 which portion 2a is provided to accommodate a rotatably mounted idler pulley indicated at 26 as being part of the pulley-belt drive arrangement 22 to be described in more detail hereinafter. Mounted in spaced relation to said nozzle housing 4 and on opposite sides thereof are a pair of identical combined shaft and bearing housings indicated respectively at 6 and 7 as spaced from each other which housing 6 and 7, respectively, enclose a pair of rotatably positioned, relatively enlarged outer shafts 8 and 9 arranged parallel to each other (see FIG. 2). Within each of said outer shafts 8, 9 are rotatably positioned the coaxially mounted, relatively small inner shafts indicated, respectively, at 10 and 11 which shafts 10 and 11 are screw-threaded on the free, outer ends thereof for a purpose to be hereinafter explained in detail. Substantially adjacent one end of each of said inner shafts 10 and 11 is incorporated a relatively enlarged cylindrical sleeve member affixed thereto and indicated, respectively, at 12 and 13, each providing suitable support for an outer, partially overlapping rotor indicated respectively at 16 and 17 which rotors 16, 17 are respectively affixed to corresponding support sleeve members 12, 13 for rotation therewith with each incorporating a plurality of slots of random length and distribution indicated, respectively, at 24, 24a and 24b, and 25, 25a and 25b. Said support sleeve members 12 and 13 are retained in respective position on inner shafts 10 and 11 by means of the nuts indicated at 18 and 19 as engaged with the threaded portion of each of said inner shafts 10 and 11. A second pair of inner, partially overlapping rotors 14 and 15 are fixedly positioned on said relatively enlarged outer shafts 8, 9 in slightly spaced and coaxial relation to said pair of outer rotors 16, 17 and also incorporate a plurality of slots of random length and distribution for purposes to be described in more detail hereinafter. To the respective ends of each of said pairs of parallel, coaxially mounted shafts 8 and 10, and 9 and 11 are respectively affixed the separate driven pulleys indicated generally at 20 and 21 in the modification of FIG. 1. It is noted that each of said coaxial pair of shafts 8 and 10, and 9 and 11 may incorporate a single driven pulley as at 20 or 21 or, alternatively, may incorporate a pair of pulleys with one mounted on each of said coaxial pair of shafts 8, 10 and 9, 11 in a manner similar to that clearly seen at 33 in FIG. 3a of the drawings. In either event, random disturbance is imparted to compressed gas being ejected from nozzle 3 by means of the random distribution of slots incorporated in coaxially mounted pairs of rotors 14, 15, 16 and 17. Pulleys 20 and 21 are driven by the pulley-belt drive arrangement indicated generally at 22 which, in turn, is controlled by the drive motor schematically illustrated at 23. Thus, by utilizing the separate driven pulley as indicated in FIG. 4a of the drawings, for example, each of said rotors 14, 15, 16, 17 may be driven at different and unrelated rotational speeds to impart even greater random disturbance on ejection of compressed gas from the aforesaid nozzle 3.

With the arrangement described above relative to FIGS. 1 and 2 of the drawings, each pair of coaxially mounted rotor shafts 8, 10 and 9, 11 is made partially overlapping in the area immediately in front of the aforesaid nozzle indicated at 3 in FIG. 1, to effect a modulation of a stream of compressed gas which is ejected therefrom during operation of the inventive acoustic siren device which modulation is specifically accomplished by means of the previously described randomly spaced slots formed in the now-rotating rotors 14, 15, 16 and 17. Thus, it is seen that since the combined rotors 14, 15, 16 and 17 actually modulate the exit area of the nozzle 3 in a random and unrelated manner, the volume flow of compressed gas being ejected therethrough is "chopped" or modulated in a random or non-repetitive manner resulting in an improved random modulation radiating noise of random character. It is noted, moreover, that the ratios of the diameters of the aforesaid driven pulleys, 20 and 21, are so independent and unrelated relative to each other that any repetition of the composite grouping of the plurality of slots "chopping" the gas stream as hereinbefore indicated during rotation of the aforesaid plurality of rotors 14, 15, 16 and 17 is extremely remote and can occur only at very large time intervals so as to practically not effect the random character of the noise.

With particular reference to FIGS. 3 and 3a of the drawings, a modified acoustic siren is indicated generally at 28 as comprising a modified gas chamber housing indicated schematically at 29 as incorporating a plurality of nozzles indicated at 30, which nozzles are distributed in an array on the front wall surface of said gas chamber housing 29 in spaced, aligned and parallel relation and are adapted to eject a plurality of gas jet streams therefrom. Positioned in spaced relation in front of or down stream of the aforesaid plurality of nozzles 30 are positioned a plurality of rotors generally at 31 similar to the rotors 14, 15, 16 and 17 previously described with reference to FIGS. 1 and 2 of the drawings but are not coaxially mounted. These rotors 31 are illustrated as built up into an array or regular arrangement covering substantially all of the entire area immediately in front of the front wall surface of the previously mentioned gas chamber housing 29 and directly in the path of the plurality of compressed gas jet streams being ejected from said plurality of nozzles 30. Each of said plurality of rotors 31 is mounted on one end of an identical and relatively elongated, separate shaft 32 rotatably positioned in spaced and parallel relation within the gas chamber housing 29. As clearly seen in the aforesaid FIG. 3a, each of said shafts 32 is mounted in parallel and spaced relation and extends in overlapping relation to the opposite ends of said housing 29. The already described rotors 31 are rigidly affixed to the front or forward end of said shafts 32, whereas, to the opposite ends thereof, separate driven pulleys as indicated generally at 33 are affixed which pulleys 33 may be driven separately in any desired manner. The aforesaid driven pulleys 33 are again selected so that the diameters thereof are different and completely unrelated relative to each other and are, accordingly, driven at different and randomly related rotational speeds. Thus, it is seen that, in the modification of FIGS. 3 and 3a, each rotor 31 modulates more than one nozzle, as previously indicated, and thus eliminates or minimizes any need for many different rotor arrangements and rotor drives. Furthermore, each of the aforesaid plurality of nozzles 30 may be supplied with gas under pressure either by means of the plurality of separate branch gas lines indicated at 34 in FIG. 3a incorporated within gas chamber housing 29 which lines 34 are illustrated in intercommunication with the common supply gas line indicated at 29a or from a common gas line alone (not shown) either of which may be in communication with a common gas supply or a common tank (not shown) adaptable for connection to a suitable source of gas supply.

Referring particularly to FIGS. 4 and 4a of the drawings, a slightly different modification of the inventive acoustic siren is indicated generally at 35 as likewise incorporating a plurality of rotors indicated generally at 36 mounted in partially overlapping and staggered relation directly in front of a plurality of oval-shaped nozzles 37 formed in the front wall surface indicated generally at 29b of the gas chamber housing indicated schematically at 38. Again, the gas stream being ejected from each nozzle 37 is modulated by the overlapping portion of more than one rotor 36. As seen clearly in FIG. 4a of the drawings, each of the aforesaid rotors 36 is mounted in coaxial pairs on one end of a coaxially positioned pair of shafts (two of which are shown) mounted within the gas chamber housing 38. Each pair of said coaxial shafts includes a relatively enlarged outer shaft 39 and a relatively small inner shaft 40 rotatably positioned within said outer shaft 39. Disposed between adjacently mounted shafts 39, 40 are alternately positioned the previously mentioned plurality of nozzles 37. Each of said nozzles 37 is provided with a source of gas supply through an individual gas line 41, in turn, supplied from a common gas line 42 adaptable for connection to a source. To the opposite ends of each of said pair of coaxially mounted shafts 39, 40 are rigidly positioned a plurality of driven pulleys indicated generally at 43, the ratio of the diameters thereof again being selected completely unrelated relative to each other to assure their operation at different and indenpendent rotational speeds.

With specific reference to FIGS. 5 and 5a of the drawings, a second modified form of the acoustic siren of the present invention is indicated generally at 44 as being combined with an acoustic horn device indicated at 45. The aforesaid horn device includes an outwardly flared, open end portion 47 at the down stream end thereof and a restricted or narrowed-down, opposite open end portion 48 at the up stream end thereof positioned in aligned spaced relation to the open down stream or nozzle end portion 49 of a gas chamber housing 46 of the aforesaid acoustic siren 44. Within the narrowed down, open end portion 48 of said horn device 45 and said gas chamber housing 46 are rigidly positioned a plurality of vertically disposed shaft supports indicated respectively at 50, 51, 52 and 53 for fixedly supporting the opposite ends of a horizontally disposed rotor-support shaft 54 which shaft extends in overlapping relation to the right and left, as viewed in FIG. 5a, through the open space between horn device 45 and housing 46. A plurality of rotors 55, 56, 57 and 58 are mounted in coaxial and free-wheeling relation on the aforesaid fixed shaft 54 in the open space between chamber housing 46 and horn device 45. Said rotors 55, 56, 57, 58 again incorporate a plurality of randomly spaced slots of random and integral lenght, as for example, those illustrated at 55a, 55b and 55c for the rotor 55 shown in FIG. 5 of the drawings and are each driven through means of a separate pulley belt arrangement indicated, respectively, at 59, 60, 61 and 62. The belt of each of said pulley-belt arrangements is engaged within a groove incorporated within the circumference of each of said rotors. It is noted that, in the arrangement described above relative to FIGS. 5 and 5a of the drawings, the diameter of the aforesaid nozzle end 49 of gas chamber housing 46 is relatively enlarged to conform with the diameter of each of the aforesaid coaxially mounted rotors 55, 56, 57, 58. With the gas stream being emitted from gas chamber housing 46 through the enlarged diameter nozzle end 49 and "chopped" or modulated by the randomly spaced and distributed slots of the rotors 55—58, a far more efficient use of available space and optimum use of total rotor area is effected. Furthermore, the need for a complicated system of rotor-drive assemblies is minimized. In addition, the modulated area of the gas stream per rotor being ejected from the aforesaid gas chamber housing 46 is large resulting in an increased noise output per rotor to an optimum amount. With the aforesaid rotor-support shaft 54 being fixed in place and the plurality of rotors 55—58 being mounted thereon in free-wheeling condition, each of said rotors may then be rotated at independent and unrelated speeds either individually or in unison, if desired, and in different directions. Of course, other rotor-drive arrangements may be utilized without departing from the spirit or scope of the invention as will be hereinafter seen.

With specific reference to FIGS. 6 and 6a of the drawings, a third modified form of the acoustic siren of the invention is indicated generally at 63 and includes in one form a total of four shafts arranged in coaxial pairs indicated generally at 64 and 65; however, any number of rotors in excess of two may be used without departing from the spirit or scope of the invention. The acoustic siren 63 comprises a gas chamber housing portion indicated in modified form at 66 as clearly illustrated in FIG. 6a to incorporate a right angle turn therein, and a horn portion 67 integrally formed therewith. The aforesaid coaxial pair of shafts 64 are relatively short in length and consist of a relatively enlarged outer shaft 64a within which is rotatably supported a relatively small, inner shaft 64b, whereas the coaxial pair of shafts 65 are relatively elongated and consist of a relatively enlarged, outer shaft 65a within which is rotatably supported a relatively small, inner shaft 65b. The aforesaid coaxially arranged pair of shafts 65 are positioned in direct alignment with and spaced from said pair of coaxial shafts 64. A separate shaft support indicated, respectively, at 68 and 69 is utilized for rotatably supporting each of the aforesaid pairs of coaxially related pairs of shafts 64 and 65. A first pair of coaxially mounted rotors 70 and 71 incorporating a plurality of slots of random space, size and distribution, as for example, those indicated in FIG. 6 at 70a 70b, and 70c for the rotor 70 are respectively affixed to the innermost ends of the coaxial pair of shafts 64 intermediately of the space between the inner ends of said pairs of coaxial shafts 64, 65. To the other ends of said pair of shafts 64 are rigidly attached a first pair of coaxially arranged driven pulleys 72 and 73 which pulleys 72, 73 are, in turn, independently driven at varying rotational speeds by means of the drive belts 74 and 75 and drive pulleys 76 and 77 adaptable for being driven by an appropriate motor drive means.

A second pair of coaxially mounted rotors 78 and 79 also incorporating a plurality of slots of random space, size and distribution, similar to those indicated at 70a, 70b and 70c for rotor 70 are respectively affixed to the innermost ends of the coaxial pair of shafts 65 spaced from first pair of rotors 70, 71 in the space between the inner ends of said pairs of coaxial shafts 64, 65. To the other ends of said pair of shafts 65 are rigidly attached a second pair of coaxially arranged driven pulleys 80 and 81 which are, in turn, independently driven at varying rotational speeds by drive belts 82 and 84 and drive pulleys 83 and 85 adaptable for being driven in any appropriate manner. It is again pointed out that the aforesaid gas chamber housing portion 66 incorporates an inside diameter acting as a nozzle of substantially the same diameter as that of the aforesaid rotors 70, 71, 78, 79 for the same purpose previously described with reference to FIGS. 5 and 5a of the drawings.

A fourth modified form of the acoustic siren of the subject invention is generally indicated at 86 in FIGS. 7 and 7a of the drawings in which is illustrated a combined gas chamber housing and horn device 87 again incorporating a right angle portion. A single rotor-support shaft is indicated at 88 as being mounted in fixed relation between the wall 87a of said combined chamber housing and horn device 87 at one end thereof and a transversely disposed shaft support element 89 at the opposite end thereof. A plurality of rotors 90, 91, 92 and 93 are mounted in free-wheeling condition on the aforesaid rotor-support shaft 88 and are each individually driven by means of a relatively small jet nozzle for each of said rotors. These jet nozzles, indicated at 94, 95, 96 and 97 are respectively supplied with a suitable gas under pressure as, for example, air by means of gas lines indicated at 98, 99, 100 and 101 (note FIG. 7a) which gas lines are, in turn, adapted to be supplied from a main source of supply as, for example, the main supply to the acoustic siren 86. This main supply of compressed gas, which may be either separate or supplied from the same source utilized with said acoustic siren, is not shown since is forms no part of the present invention and may, of course, be a standard supply source. The air or other compressed gas so supplied to gas lines 98, 99, 100, 101 (FIG. 7a) is fed to the various jet nozzles for each of the aforesaid rotors by means of the path indicated by the arrows in FIG. 7. In connection with the latter, it is noted that the speed for the aforesaid jet nozzle 94 is shown in FIG. 7 wherein a branch gas line is provided as indicated at 102 for d:verting part of the gas supply from gas line 98 where it is fed to the lowermost portion of the rotor 90 by means of the reversed portion 102a. A similar branch gas line (not shown) is utilized for each of the other gas lines 99, 100 and 101 respective'y in communication with rctors 91, 92 and 93. The aforesaid reversed portion 102a constitutes another jet nozzle into which is fed the diverted gas by way of said branch gas line 102, said jet nozzle 102a being positioned adjacent to the underside of said rotor 90. A similar jet nozzle is positioned adjacent to the underside of each of said rotors 91, 92 and 93 and are in respective communication with the other branch gas lines 99, 100, 101, provided therefor. Said lower jet nozzle 102a, as well as the other similar jet nozzles (not shown), respectively provided for rotors 90, 91, 92 and 93 assist previously-described upper jet nozzles 94, 95, 96 and 97 in driving the aforesaid rotors 90, 91, 92 and 93 in the manner set forth hereinbelow. The latter operation is effected with the outer circumference of each of said rotors incorporating a series of blades or vane-like elements thereon, each series of which is contacted on the uppermost and lowermost surfaces thereof by a jet stream of compressed gas being supplied thereto from the combined pair of upper and lower jet nozzles described above and mounted adjacent thereto. In this manner, each rotor acts as an air turbine and is driven by the jet stream being ejected directly onto the blade-like circumference thereof at two points. Of course, the aforesaid p'urality of rotors are each slotted as hereinbefore explained and as indicated at 103, for example, for said rotor 90. Thus, the need for individual belt and pulley drive assemblies as well as electrical power is eliminated.

Thus, a new and improved acoustic siren has been developed by the present invention wherein improved random, mechanical modulation of an air or other gas jet flow results in the generation of more effective high intensity, wide band noise by means of a novel and improved system emp'oy'ng a series of overlapping, randomly slotted rotors revolving at different and unrelated speeds to produce an improved random mechanical modulation of a jet stream and resulting wide band noise.

We claim:

An improved acoustic siren for generating random noise comprising a main housing having a plurality of jet nozzle orifices positioned in the front wall surface thereof in spaced, parallel and aligned relation and adapted for communication with a common gas supply chamber through means of a plurality of separate branch gas lines incorporated within said main housing and in communication with a common gas supply line to eject a plurality of compressed gas streams therefrom, a plurality of separate parallel, spaced and aligned, equal length driven shafts rotatably positioned within said housing in surrounding, alternate relation to said jet nozzle orifices and terminating in adjacent rotor-support shaft end portions, a plurality of separate, driven pulleys of unrelated diameters respectively mounted in adjacently positioned pairs on said rotor-support shaft end portions of said separate driven shafts remote from said plurality of jet nozzle orifices, a plurality of adjacently positioned pairs of parallel-extending rotors positioned on the ends of said driven shafts remote from said driven pulleys with each rotor having slotted portions incorporated therein in partial overlapping relation to each other immediately in front of said plurality of jet nozzle orifices directly in the path of more than one jet stream, the slotted portions on each rotor being arranged in random and unrelated manner to each other and to the slotted portions incorporated in adjacently positioned rotors, and drive means interconnected with the respective adjacently positioned, rotor-support end portions remote from the ends thereof supporting said rotors for independently rotating each of said rotors at different and unrelated speeds, each of said jet nozzle orifices being independently provided with gas under pressure by said plurality of separate branch gas lines, said rotor-support end shaft drive means comprising a plurality of rotor-support, driven shafts positioned in an array relative to, and surrounding, said jet nozzle orifices and a plurality of separate drive pulleys disposed in alternately staggered pairs on the ends of said rotor-drive shafts remote from said rotors, each of said alternately disposed pairs of pulleys being of different and unrelated diameters to drive said rotors at independent and unrelated speeds to effect a wide band, high-intensity noise environment.

References Cited in the file of this patent

UNITED STATES PATENTS

| | | |
|---|---|---|
| 1,786,264 | Reed | Dec. 23, 1930 |
| 2,153,500 | Eanes | Apr. 4, 1939 |
| 2,528,026 | Allen | Oct. 31, 1950 |
| 2,688,302 | Desmond | Sept. 7, 1954 |
| 2,715,383 | Meng | Aug. 16, 1955 |
| 2,717,519 | Kooistra | Sept. 13, 1955 |
| 2,730,067 | Schaufler | Jan. 10, 1956 |
| 2,912,958 | Von Gierke | Nov. 17, 1959 |